(12) United States Patent
Grewell

(10) Patent No.: US 6,329,629 B1
(45) Date of Patent: Dec. 11, 2001

(54) DISTANCE MODE CONTROL FOR LASER WELDING

(75) Inventor: David Grewell, Waterbury, CT (US)

(73) Assignee: Branson Ultrasonics Corporation, Danbury, CT (US)

(*) Notice: Subject to any disclaimer, the term of this patent is extended or adjusted under 35 U.S.C. 154(b) by 0 days.

(21) Appl. No.: 09/560,220

(22) Filed: Apr. 28, 2000

(51) Int. Cl.[7] .......................... B23K 26/20; B29C 65/16
(52) U.S. Cl. ........................ 219/121.61; 219/121.63; 219/121.64; 219/121.83; 156/272.8; 156/309.6; 264/249; 264/479; 264/482; 264/40.5; 425/150
(58) Field of Search .................. 219/121.61, 121.62, 219/121.63, 121.64, 121.65, 121.66, 121.83; 156/272.8, 309.6, 245, 92; 264/249, 479, 482, 40.5; 425/150

(56) References Cited

U.S. PATENT DOCUMENTS

| | | | |
|---|---|---|---|
| 4,767,298 | * | 8/1988 | Bocchicchio et al. ............ 425/112 |
| 4,893,742 | * | 1/1990 | Bullock ........................ 219/121.63 |
| 5,773,783 | * | 6/1998 | Bowerman ..................... 219/117.1 |
| 5,793,461 | * | 8/1998 | Inou ............................. 349/153 |
| 5,814,784 | * | 9/1998 | Kinsman et al. ............... 219/121.6 |

* cited by examiner

*Primary Examiner*—Samuel M. Heinrich
(74) *Attorney, Agent, or Firm*—Harness, Dickey & Pierce, P.L.C.

(57) ABSTRACT

A laser joining system deforms a workpiece projection based on collapse of the projection to a predetermined displacement. The laser joining system has a laser system for generating a predetermined level of laser radiation based on radiation control signals. An actuation system directs the laser radiation to the projection and contacts the projection with a laser head based on forced control signals. The actuation system also generates position feedback based on a position of the laser head, wherein the position feedback includes a reference position of the laser head. The joining system further includes a controller communicating with the laser system and the actuation system. The controller generates the radiation control signals and the force control signals based on the position feedback. When the projection collapses to a predetermined displacement with respect to the referenced position, one of the radiation control signals causes the laser system to discontinue generation of the laser radiation. Controlling laser radiation on the basis of collapse distance allows improved consistency and reduced rework costs.

20 Claims, 9 Drawing Sheets

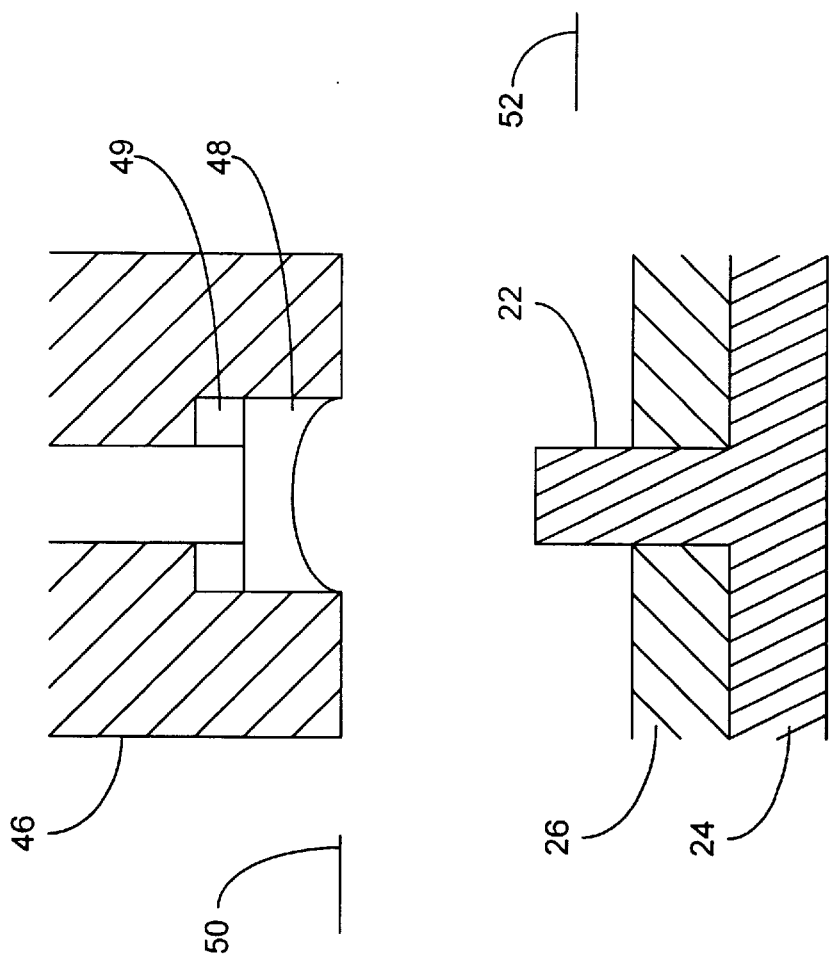

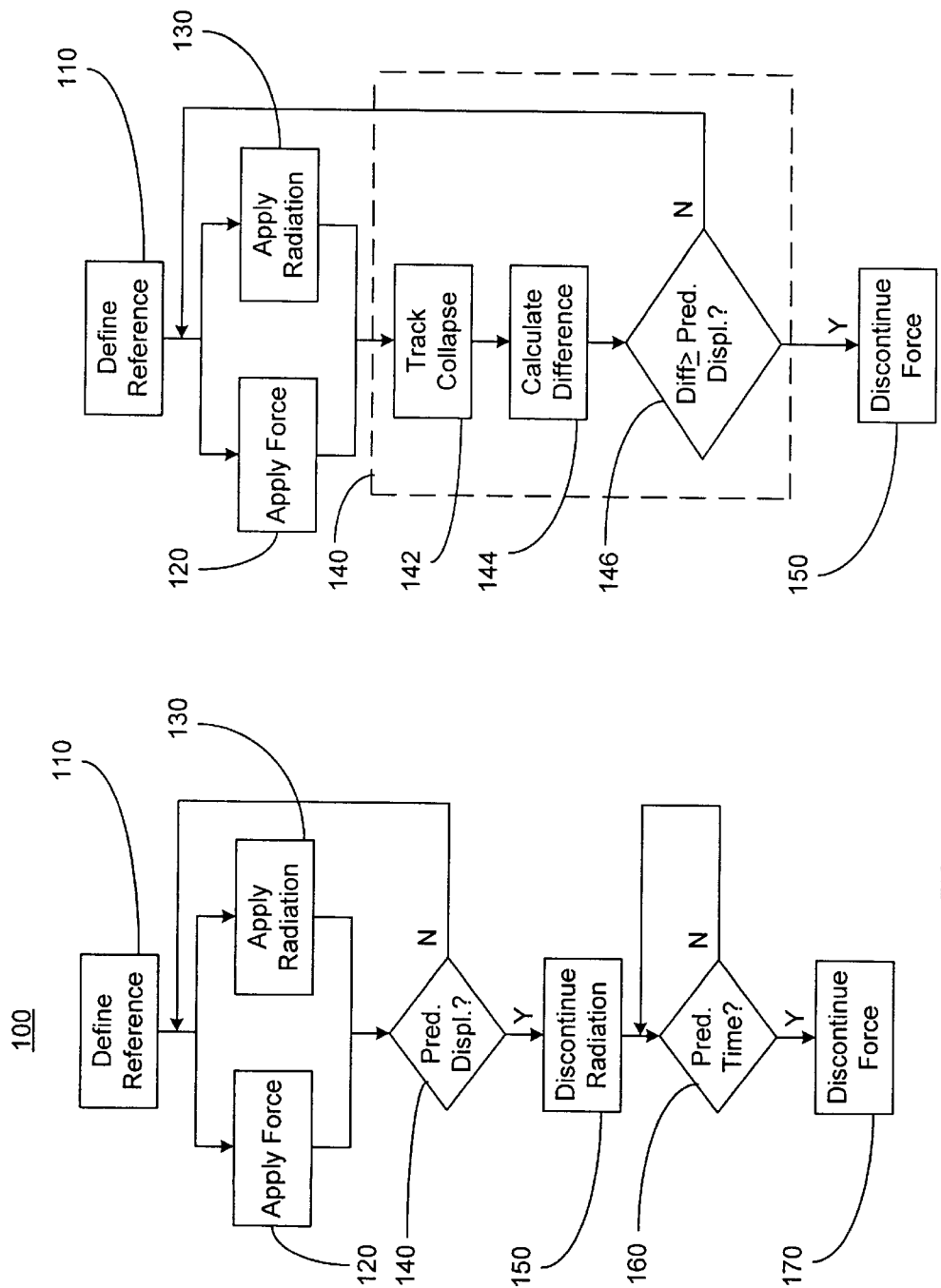

DISTANCE MODE CONTROL FOR LASER WELDING

TECHNICAL FIELD

The present invention relates generally to laser staking and welding. More particularly, the invention relates to discontinuing the application of laser radiation to a thermoplastic projection when the projection collapses to a predetermined displacement with respect to a reference position.

BACKGROUND ART

In many industries it is necessary to deform and shape a thermoplastic projection of a workpiece as a part of a fastening or staking process. For example, in the automotive industry it is common for an emblem to be staked to the center of a steering wheel closeout. While earlier approaches to performing such staking activities involved the use of ultrasonics and hot air, ultrasonics typically produce part marking and hot air often results in damage due to over spray of the hot air.

As a result of the above limitations associated with ultrasonics and hot air, laser staking has evolved in many industries. In conventional laser staking approaches, a projection of a workpiece is deformed by applying a predetermined level of laser radiation and a predetermined weld force to the projection with a specialized dye. The predetermined weld force and the predetermined level of laser radiation cause the projection to melt and collapse into the shape of the dye. After a predetermined period of time, the laser radiation and weld force are discontinued, and the projection is allowed to solidify. After solidification, the staking process is complete and the workpiece is fixed to the adjacent part.

A particular area of potential improvement for the above laser staking process relates to what parameter is monitored to determine when to discontinue the laser radiation and weld force. Specifically, the above discussed weld time control strategies fail to take into account molding and environmental history variables for the parts being staked together. For example, various projections will exhibit varying amounts of collapse for a given weld force, laser radiation and staking time. The final assemblies would therefore have varying overall physical dimensions due to collapse inconsistencies. The present invention recognizes that the collapse distance of the projection is the parameter of most interest and in large part determines the strength and quality of the part connection. It is therefore highly desirable to provide a mechanism for controlling the laser staking process which takes into consideration the staking parameter of most interest, i.e., collapse distance. Such a mechanism would provide reduced rework costs and improved quality.

The difficulties relating to determining what parameter to monitor in order to determine when to discontinue the laser radiation and weld force are equally applicable in other areas of laser welding. For example, in through transmission infrared (TTIr) welding, a first part that is transparent to the laser radiation is welded to a second part that absorbs the radiation. The laser radiation raises the temperature of the absorbent material to a critical melting temperature and the pressure is applied to press the parts together. A weld or bond joins the parts as the melt cools. TTIr welding has widespread application due to its relatively rapid formation of the weld as well as the strength and uniformity of the joint. Thus, in TTIr welding the collapsed distance within the weld zone can be most representative of the strength and quality of the part connection. It is therefore also highly desirable to provide a mechanism for controlling TTIr welding which takes into consideration the welding parameter of most interest, i.e., the collapsed distance.

SUMMARY OF THE INVENTION

The above and other objectives are provided by a system and method in accordance with the present invention for deforming a projection of or creating a weld within a workpiece to join an assembly of parts. The method includes the steps of applying a predetermined weld force to the assembly, and applying a predetermined level of laser radiation to the assembly. The predetermined weld force and the predetermined level of laser radiation cause the assembly to collapse. The method further provides for discontinuing application of the laser radiation when the assembly collapses to a predetermined displacement with respect to a reference position. In one embodiment of the present invention, application of the weld force is discontinued upon expiration of a predetermined time period after the radiation is discontinued to allow for solidification of the assembly.

Further in accordance with the present invention, a method for discontinuing application of laser radiation to a thermoplastic projection when the projection collapses to a predetermined displacement with respect to a reference position is disclosed. The method includes the steps of defining the reference position, and tracking a collapse position for the projection. A difference between the reference position and the collapse position is calculated and compared to the predetermined displacement.

The present invention also provides a laser staking system for deforming a projection of a workpiece and a laser joining system for joining an assembly of parts. Each system has a laser system, an actuation system, and a controller. The laser system generates a predetermined level of laser radiation based on radiation control signals. The actuation system directs the predetermined level of radiation to the parts and contacts the parts with a laser head based on forced control signals. The actuation system further generates position feedback based on a position of the laser head, where the position feedback includes a reference position. The controller communicates with the laser system and the actuation system, and generates the radiation control signals and the force control signals based on the position feedback from the actuation system. One of the radiation control signals causes the laser to discontinue generation of the laser radiation when the parts collapse to a predetermined displacement with respect to the referenced position.

BRIEF DESCRIPTION OF THE DRAWINGS

The various advantages of the present invention will become apparent to one skilled in the art by reading the following specification and subjoined claims and by referencing the following drawings in which:

FIG. 6 is a cross-sectional side view of a laser head at an absolute initial position in accordance with the present invention;

FIG. 7 is a cross-sectional side view of a laser head in an initial projection position in accordance with the present invention;

FIG. 9 is a flowchart of a computerized method for deforming a projection of a workpiece in accordance with the present invention;

FIG. 10 is a flowchart of a process for discontinuing application of laser radiation to a thermoplastic projection when the projection collapses to a predetermined position in accordance with the present invention.

DETAILED DESCRIPTION OF THE PREFERRED EMBODIMENTS

Figure 1:
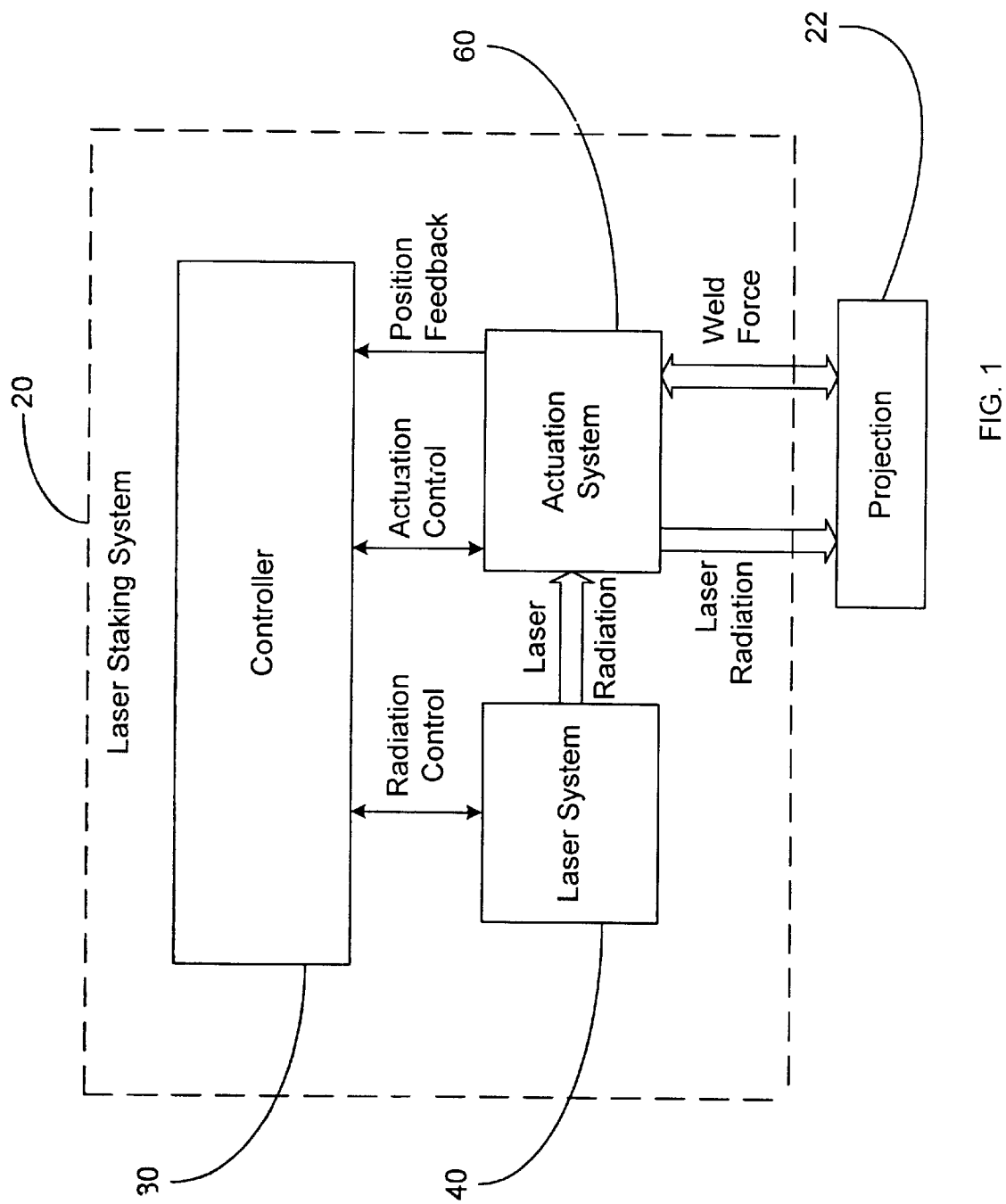
FIG. 1 is a block diagram of a laser staking system in accordance with the present invention.

Referring to FIG. 1, the preferred laser joining system 20 for joining an assembly of parts, or in one embodiment, for deforming a thermoplastic projection 22 of a workpiece is shown. It will be appreciated that while the system 20 is described with respect to a staking process as applied to projection 22, the present invention can be readily modified for non-staking processes as applied to any assembly of thermoplastic parts.

Figure 8:
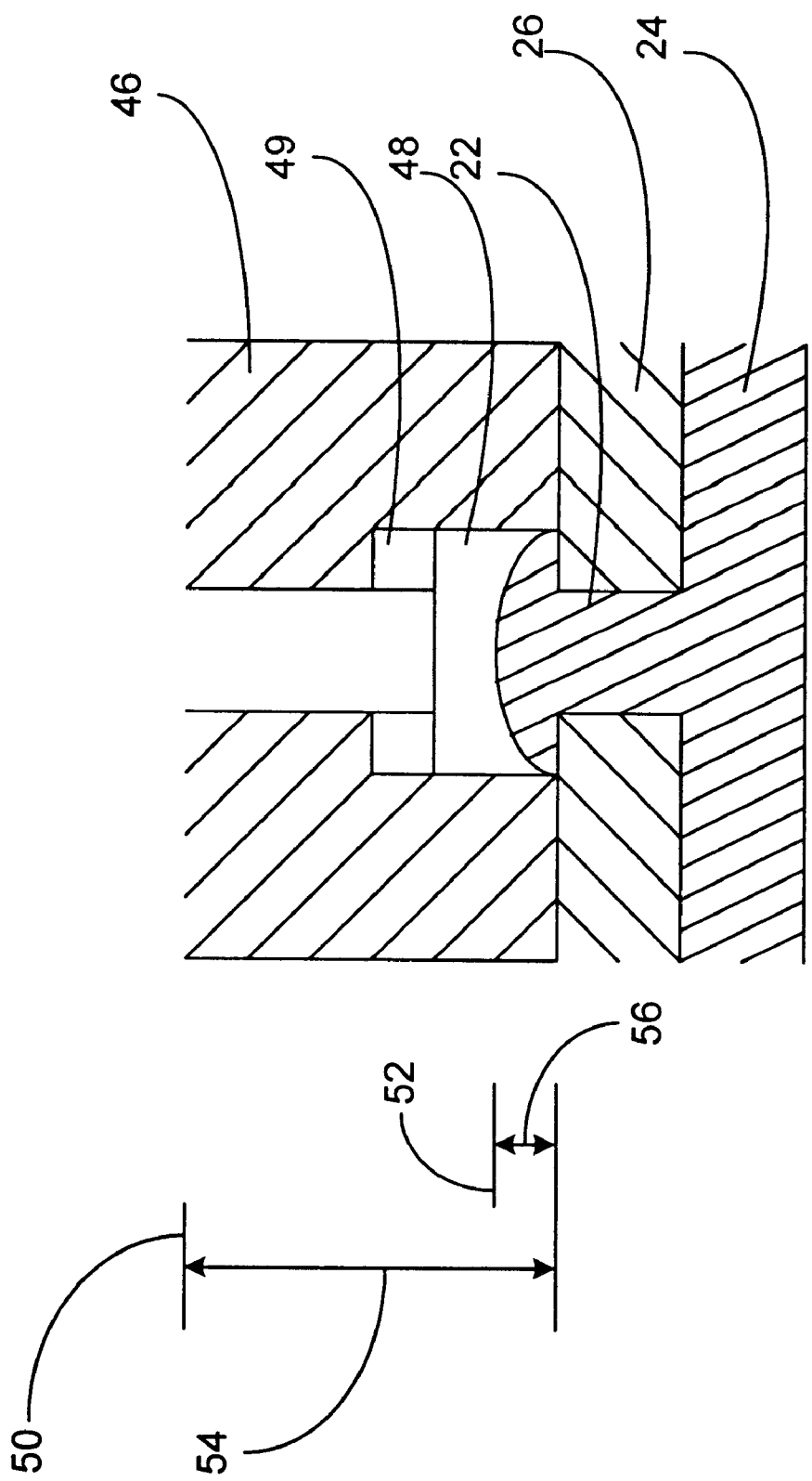
FIG. 8 is a cross-sectional side view of a laser head in a position where the projection has collapsed to a predetermined displacement with respect to a reference position.

Accordingly, the following description of the deformation of the projection in a staking system and the measurement of the projection collapse should be understood to apply equally to the displacement or collapse that may occur during through transmission welding of a first part that is transparent to laser radiation and a second thermoplastic part that absorbs the radiation. The joining system 20 includes a laser system 40, an actuation system 60, and a controller 80. The laser system 40 generates a predetermined level of laser radiation based on radiation control signals. For the purposes of this invention, the laser radiation may be of any frequency or wavelength sufficient to induce the desired melting and temperature control of the thermoplastic projection 22. Notwithstanding the general applicability of the invention over a variety of frequencies and wavelengths, for staking applications using thermoplastic projections such as that described herein, the wavelength of the laser radiation is preferably within the range of about 600 to about 1000 nm. The actuation system 60 directs the laser radiation to the projection 22 and contacts the projection 22 with a laser head based on force control signals. Contacting the projection 22 with the laser head results in a predetermined weld force. The combination of the predetermined weld force and the predetermined level of laser radiation causes the projection 22 to collapse such that a workpiece 24 may be staked to a part 26 (FIG. 8).

The actuation system 60 generates position feedback based on a position of the laser head, where the position feedback includes a reference position of the laser head. It can be seen that the controller 80 communicates with the laser system 40 and the actuation system 60. The controller 80 generates the radiation control signals and the force control signals based on the position feedback from the actuation system 60. When the projection 22 collapses to a predetermined displacement with respect to the reference position, one of the radiation cortrol signals from the controller 80 causes the laser system 40 to discontinue generation of the laser radiation. Controlling the laser radiation based on position feedback represents a significant improvement over time-based laser joining approaches.

Figure 2:
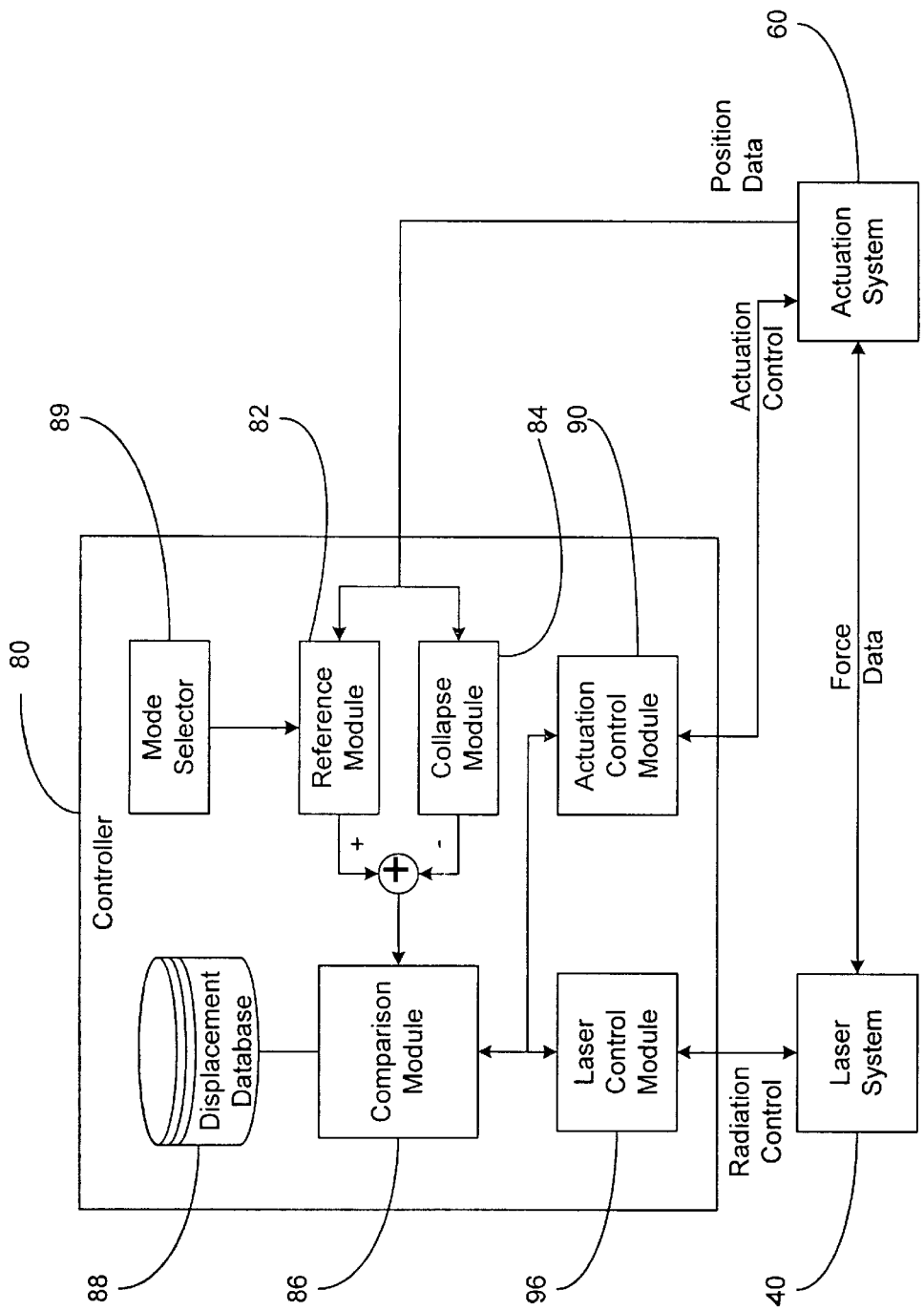
FIG. 2 is a block diagram of a controller in accordance with the present invention.

Turning now to FIG. 2, one embodiment of the controller 80 is shown in greater detail. Specifically, the controller 80 can include a reference module 82 for defining the reference position of the head 46, and a dynamic collapse module 84 for tracking a collapse position for the projection 22 (FIG. 1) by monitoring the position of the head. Thus, the position feedback also includes a dynamic collapse position for the projection 22. A summation module calculates the difference between the reference position and the collapse position, and a comparison module 86 compares the difference to a predetermined displacement that is specific to the particular application. It is preferred that a displacement database 88 contains the predetermined displacement information required for comparison module 86 to make its comparison. The information in the displacement database 88 can relate to all potential parts and assemblies to be joined by the joining system 20. The comparison module 86 signals a laser control module 96 to discontinue the radiation when the difference between the reference position and the collapse position equals the predetermined displacement.

It will be appreciated that the present invention further provides for various modes of defining the reference position. Thus, a mode selector 89 is included with the controller to provide a mechanism for transitioning between the modes. For example, the reference module 82 can record an initial projection position as the reference position, or an absolute initial position as the reference position. The various modes of defining the reference position will be discussed in greater detail below.

Figure 3:
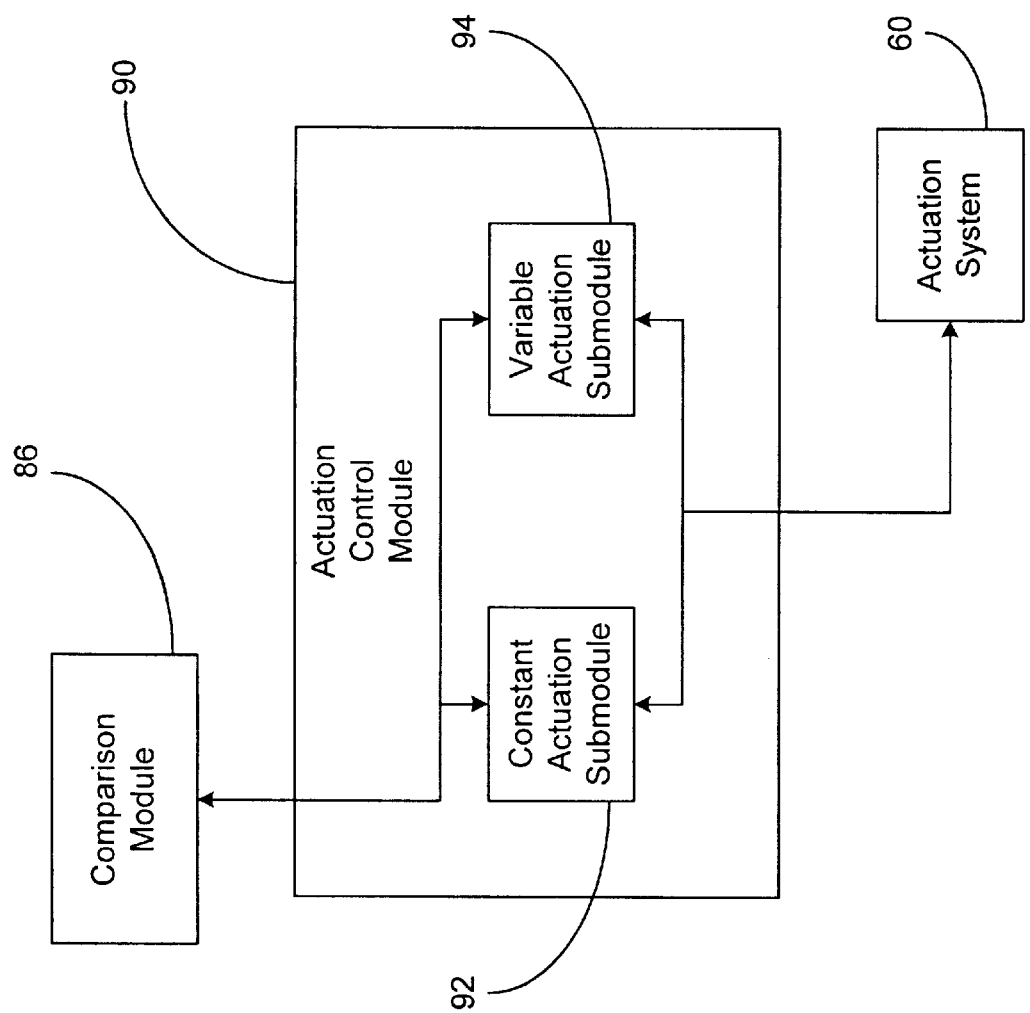
FIG. 3 is a block diagram of a controller actuation control module in accordance with the present invention.
Figure 4:
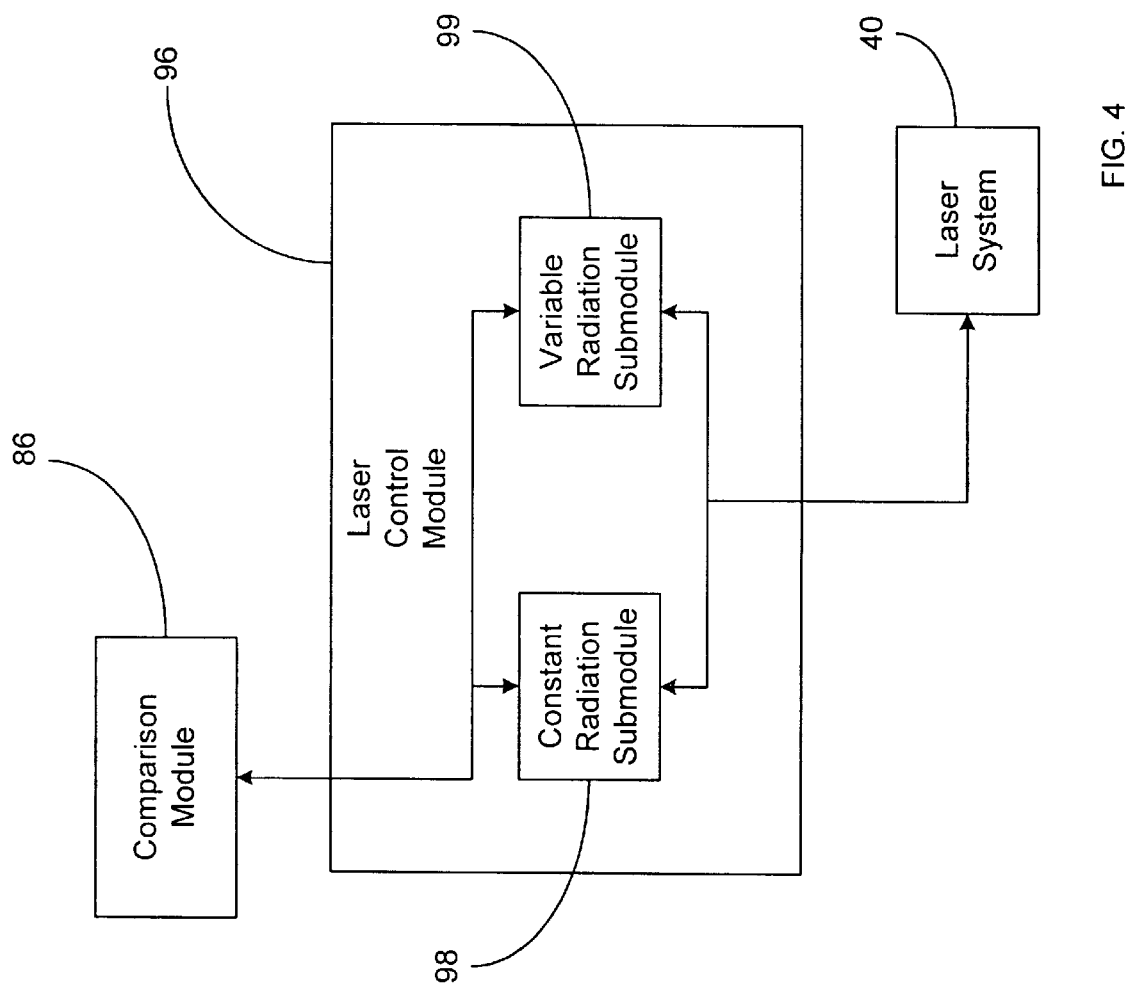
FIG. 4 is a block diagram of a controller laser control module in accordance with the present invention.

It will further be appreciated that the controller 80 can also include an actuation control module 90 for communicating constant weld force data or variable weld force data to the actuation system 60. As a result, while the radiation and weld forces are referred to herein based upon "predetermined" levels, the magnitude of these values may be constant or variable throughout the weld process. By way of example, FIG. 3 demonstrates that the actuation control module 90 of the controller 80 can have a constant actuation sub-module 92 for generating the constant weld force data and a variable actuation sub-module 94 for generating the variable weld force data. Similarly, FIG. 4 demonstrates that the laser control module 96 of the controller 80 can include a constant radiation sub-module 98 for generating constant radiation data and a variable radiation sub-module 99 for generating variable radiation data.

Figure 5:
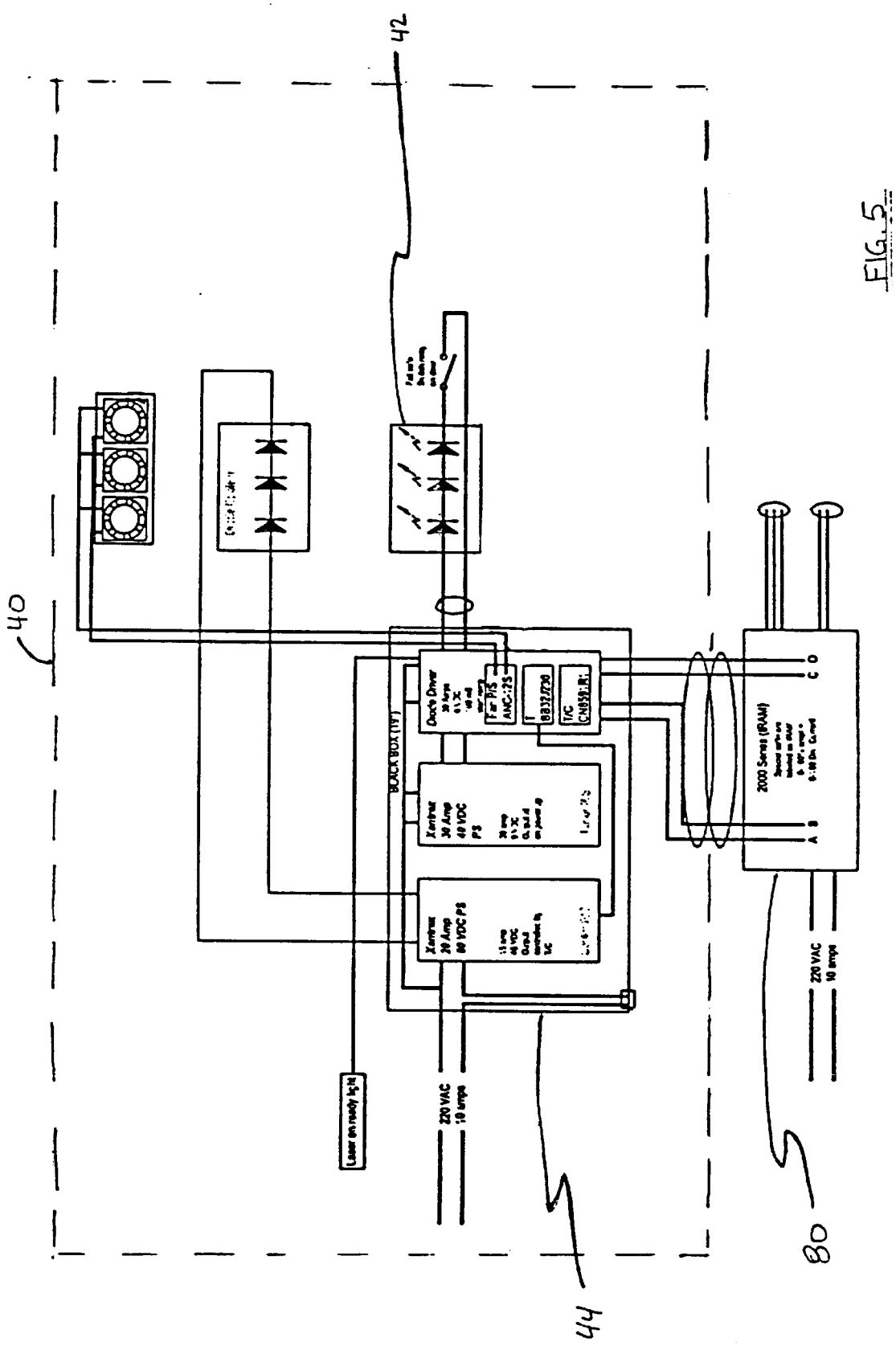
FIG. 5 is a circuit schematic of a laser system in accordance with the present invention.

FIG. 5 demonstrates one embodiment of the laser system 40. Specifically, it can be seen that the laser system 40 uses a diode array 42 to generate the laser radiation. The laser radiation from the diode array 42 can be piped to a laser head 46 (FIGS. 6–8) via optical fibers or other suitable optical transmission mechanism. A laser sub-system 44 acts as a "black box" and provides current to the diode array 42 in response to a radiation control (drive) signal from the controller 80.

As will be discussed below, the laser head of the laser head 46 has a pressure transducer for providing the actuation system 60 (FIG. 1) with force feedback. This allows the actuation system 60 to determine when the projection 22 has been contacted, as well as how much force is being applied. When the force feedback indicates that the projection 22 has been contacted and the joining system 20 is operating in collapse mode (to be described later), the actuation system 60 reports an initial projection position back to the controller 80. In such case, the initial projection position is defined as the reference position. The actuation system 60 uses an encoder (not shown), which is also mounted in the laser head 46, to provide the controller 80 with the necessary position data. Both the transducer and the encoder can be commercially available "off-the-shelf" parts and are well known in the art.

Turning now to FIGS. 6–8, the joining and laser staking process of the present invention is demonstrated in greater detail. With specific reference to FIG. 6, it can be seen that a workpiece 24 having a projection 22 is to be joined with an adjacent part 26. The laser head 46 has a die 48 and a pressure sensing mechanism such as a transducer 49. As already discussed, the reference position can be defined based on either an absolute initial position 50 or an initial projection position 52. If the reference position is defined based on the absolute initial position 50, the joining system 20 is said to be operating in the "absolute mode."

FIG. 7 demonstrates movement of the laser head 46 toward the projection 22 until contact is made at an initial projection position 52 which can be defined as the reference position when the system is operating in the "collapse mode". In the collapse mode, the transducer 49 reports a contact force back to the actuation system 60. When the contact force reaches a predefined trigger force, the position of the laser head is stored as the initial projection position 52. It will also be appreciated that the trigger force can serve as a mechanism for beginning the laser radiation 41.

During welding, the laser head 46 applies the predetermined level of laser radiation to the projection 22 until the projection 22 collapses to the predetermined displacement shown in FIG. 8. If the absolute initial position 50 is used as the reference position (i.e., the absolute mode), the predetermined displacement 54 will serve as the distance for discontinuing application of the laser radiation 41 (FIG. 7). On the other hand, if the initial projection position 52 is used as the reference position (i.e., the collapse mode), predetermined displacement 56 will serve as the distance for discontinuing application of the laser radiation 41. It should be appreciated that the laser head 46 also applies the weld force while the projection 22 is being collapsed, that is, as the laser head 46 moves from its initial projection position to its predetermined displacement. The laser head 46 may be maintained in its predetermined displacement position for a period of time following termination of the laser radiation so as to allow the projection to solidify while being constrained by the die configuration. During this solidification period, which may be programmed by the user, the weld force is generally decreased to maintain the projection position.

Turning now to FIG. 9, a computerized method 100 for joining an assembly of parts is shown for programming purposes. It will be appreciated that the present invention can be implemented in either hardware or software, or both, using techniques well known in the art. Specifically, it can be seen that at step 110 the reference position is defined. At step 120 a predetermined weld force is applied to the assembly, and at step 130 a predetermined level of laser radiation is applied to the assembly. As already discussed, the predetermined weld force and the predetermined level of laser radiation cause the assembly to collapse. At step 140 it is determined whether the assembly has collapsed to a predetermined displacement with respect to the reference position. If so, the application of the laser radiation is discontinued at step 150. If the predetermined displacement has not been reached, the predetermined weld force and laser radiation continue to be applied. One embodiment of the present invention further includes the step 160 of determining whether a predetermined time period has expired for the purposes of discontinuing application of the predetermined weld force at step 170. This allows the assembly to solidify.

FIG. 10 shows the step 140 of determining whether the predetermined displacement has been reached in greater detail. Specifically, at step 142 a collapse position for the assembly is tracked. This can be achieved by merely recording the position data provided by the actuation system encoder. At step 144 a difference between the reference position and the collapse position is calculated. The difference is then compared to the predetermined displacement at step 146. The laser radiation is terminated and the force discontinued when the difference is greater than or equal to the predetermined displacement. A cool down period may also be applied for solidification.

Figure 11:
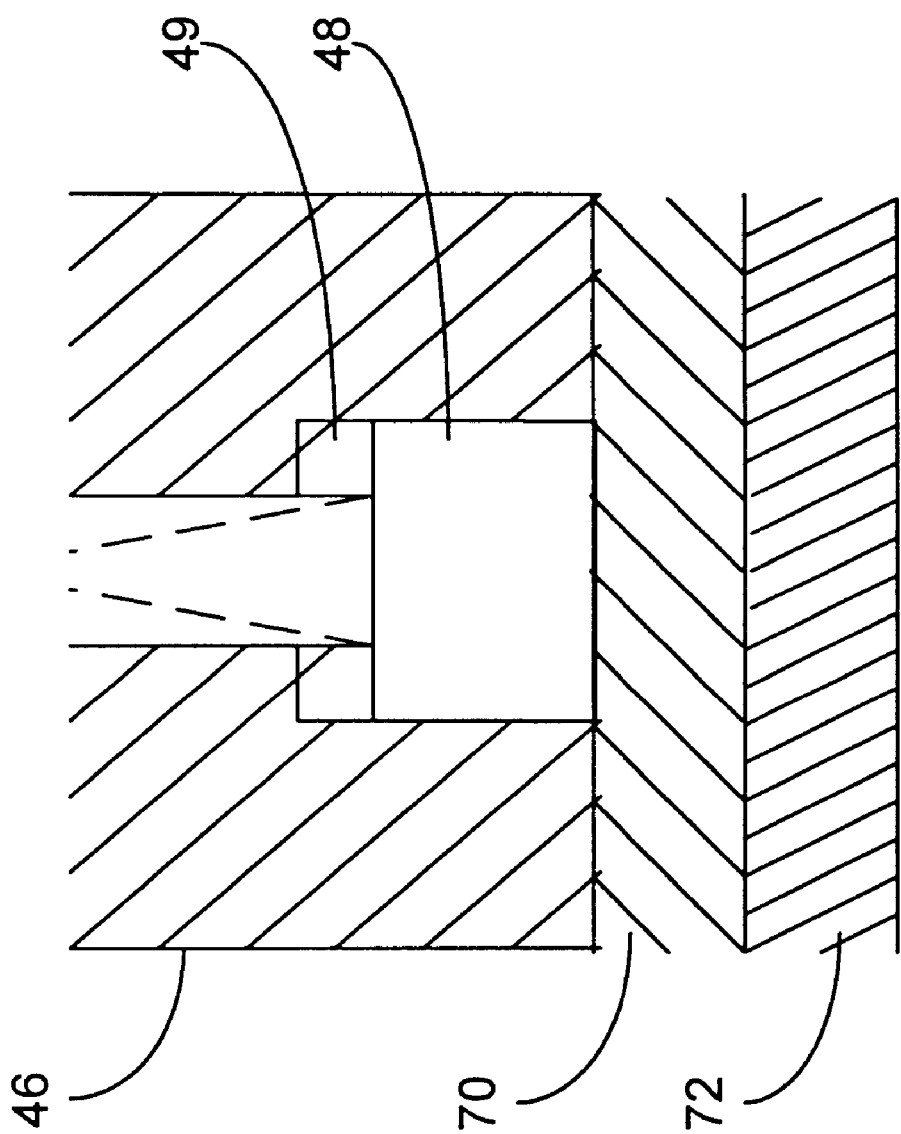
FIG. 11 is a cross-sectional side view of a laser head with respect to a TTIr welding operation in accordance with the present invention.

It is important to note that while the present invention has generally been described with respect to thermoplastic material, any material in which the laser radiation can have a frequency sufficient to induce melting of the material can be used. Moreover, as is generally noted above, the distance mode of controlling when the laser radiation and pressure is discontinued may be applied to various other applications including TTIr welding. For completeness, the beginning of a representative TTIr welding application is generally illustrated in FIG. 11. In this application, the laser radiation is nearly one hundred percent transparent to a first clear part 70 but absorbent relative to a second absorbent part 72. In most TTIr applications, the second absorbent part 72 is black in color. A series of diodes are commonly positioned in side-by-side relation in a diode array to produce a radiation line that matches the contour of the desired weld line. The laser radiation passes through the first clear part 70 and impacts the second part 72 which is preferably an 25 absorbent polymer. As the second part 72 is heated to a critical melting temperature, the head 46 is displaced to press the two parts together. The distance that the head 46 is displaced is again the parameter that is measured to discontinue the radiation and pressure. The pressure may be maintained as the weld or bond cools to form the joint. It should be appreciated that the above discussed control techniques have equal applicability to the TTIr applications, as well as various other laser welding techniques.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for joining an assembly of parts, the method comprising the steps of:
    applying a predetermined weld force to the assembly;
    applying a predetermined level of laser radiation to the assembly, the predetermined weld force and the predetermined level of laser radiation causing the assembly to collapse; and
    discontinuing application of the laser radiation when the assembly collapses to a predetermined displacement with respect to a reference position.

2. The method of claim 1 further including the steps of:
    defining the reference position;
    tracking a collapse position for the assembly; and
    comparing a difference between the reference position and the collapse position to the predetermined displacement.

3. The method of claim 2 further including the steps of recording an initial assembly position and defining the reference position as the initial assembly position.

4. The method of claim 2 further including the steps of recording an absolute initial position and defining the reference position as the initial projection position.

5. The method of claim 1 wherein the predetermined weld force is variable.

6. The method of claim 1 wherein the assembly includes a thermoplastic material, the laser radiation having a frequency sufficient to induce melting of the thermoplastic assembly.

7. The method of claim 6 wherein the predetermined level of laser radiation is constant.

8. The method of claim 6 wherein the predetermined level of laser radiation is variable.

9. The method of claim 1 further including the step of discontinuing application of the weld force upon expiration of a predetermined time period.

10. A method for discontinuing application of laser radiation to a thermoplastic projection when the projection collapses to a predetermined displacement with respect to a reference position, the method comprising the steps of:

defining the reference position;

tracking a collapse position for the projection; and comparing a difference between the reference position and the collapse position to the predetermined displacement.

11. The method of claim 10 further including the step of recording an initial projection position and defining the reference position as the initial projection position.

12. The method of claim 10 further including the step of recording an absolute initial position and defining the reference position as the initial projection position.

13. A laser joining system for joining an assembly of parts, the laser joining system comprising:

a laser system for generating a predetermined level of laser radiation based on radiation control signals;

an actuation system for directing the laser radiation to the parts and contacting the parts with a laser head based on force control signals, the actuation system generating position feedback based on a position of the laser head, the position feedback including a reference position of the laser head; and a controller communicating with the laser system and the actuation system, the controller generating the radiation control signals and the force control signals based on the position feedback, one of the radiation control signals causing the laser system to discontinue generation of the laser system radiation when the parts collapse to a predetermined displacement with respect to the reference position.

14. The joining system of claim 13 wherein the position feedback further includes a collapse position for the parts, the controller including:

a reference module for defining the reference position;

a collapse module for tracking the collapse position; and a comparison module for comparing a difference between the reference position and the collapse position to the predetermined displacement.

15. The joining system of claim 14 wherein the reference module records an initial part position as the reference position.

16. The joining system of claim 14 wherein the reference module records absolute initial position as the reference position.

17. The joining system of claim 14 wherein the controller further includes an actuation control module for generating the actuation control signals, the actuation control signals including a constant weld force signal.

18. The joining system of claim 14 wherein the controller further includes an actuation control module for generating the actuation control signals, the actuation control signals including a variable weld force signal.

19. The joining system of claim 14 wherein the controller discontinues contacting of the parts with one of the actuation control signals upon expiration of a predetermined time period.

20. The joining system of claim 19 wherein the predetermined time period allows the parts to solidify.

* * * * *